May 15, 1951 L. Z. LaFOREST 2,553,140

PHONOGRAPHIC TRANSLATING DEVICE

Filed June 1, 1946

INVENTOR

Louis Z. LaForest

By Henry Lanahan

ATTORNEY

UNITED STATES PATENT OFFICE 2,553,140

PHONOGRAPHIC TRANSLATING DEVICE

Louis Z. La Forest, Parsippany-Troy Hills Township, Morris County, N. J., assignor to Thomas A. Edison, Incorporated, West Orange, N. J., a corporation of New Jersey Application June 1, 1946, Serial No. 673,720

5 Claims. (Cl. 274—30)

This invention relates to a novel device for recording on and/or reproducing from phonographic records.

The invention has particular utility in connection with dictating machines of the type which use cylindrical records, and is herein shown and described in connection with such a machine, but no unnecessary limitation thereto is intended.

It is an object of my invention to provide a unitary phonographic recording and/or reproducing device having a floating stylus system movable independently of the translating unit and operatively connected directly to the vibratile portion of the translating unit.

It is another object to provide novel means for adjusting the translating unit of such a device relative to the record to condition the device selectively for recording and reproducing.

It is another object to provide a recording and/or reproducing device having a floating stylus system including a single stylus lever which is slidably and pivotally connected directly to the vibratile portion of the translating unit.

It is another object to provide a novel means coacting with the floating stylus system for controlling the pressure of the styli against the record.

It is another object to provide novel means in combination with the stylus pressure-control means for locking the floating stylus system against a lateral freedom of movement when the device is conditioned for recording.

It is a further object to provide an improved type of magnetic translating device wherein the aforestated objectives are fulfilled.

Other objects and features of my invention lie in the details of construction, arrangement of parts and combinations of elements of the embodiment herein shown and described as will be apparent from the following description and the appended claims.

In the description of my invention reference is had to the accompanying drawings, of which:

Figures 1, 2, 3, 4, 5, 6:
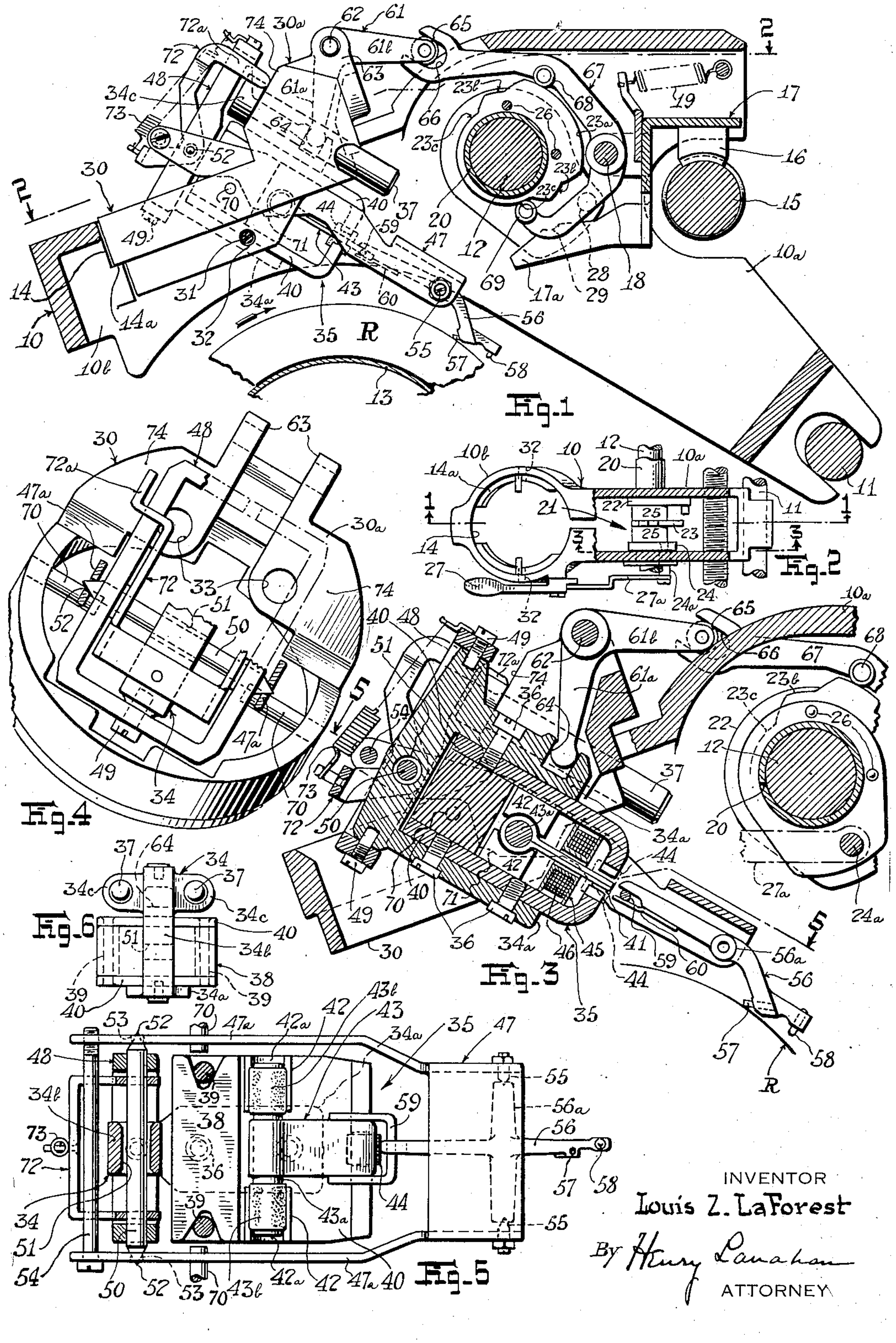
Figure 1 is a side elevational view of a phonographic translating device according to my invention showing the device mounted on a standard carriage of a dictating machine, the carriage being shown in section substantially on the line 1—1 of Figure 2.
Figure 2 is a fractional view to reduced scale of the carriage taken substantially on the line 2—2 of Figure 1.
Figure 3 is a sectional view taken centrally through the translating device and showing part of the carriage structure in section substantially on the line 3—3 of Figure 2.
Figure 4 is a fractional projection of the mechanism of Figure 3.
Figure 5 is a fractional sectional view taken substantially on the line 5—5 of Figure 3.
Figure 6 is an end view of the translating unit and its mounting frame.

The carriage 10 shown in Figures 1 and 2 for the translating device of my invention is one of standard form commonly used in dictating machines and need not be herein described in detail. This carriage is mounted slidably on two cross rods 11 and 12 for traveling movement along a record R mounted on a mandrel 13. Typically, the record is made of a wax material and has a cylindrical shape, and the carriage is moved along the axis of the record. The carriage has a hollow rearward part 10a traversed by the mounting rods 11 and 12 which houses certain control mechanism hereinafter described, and has a forward arm 10b which overlies the record and which has a mounting aperture 14 with an interior seating shoulder 14a for the translating device. At the rear of the carriage there is a feed screw 15 which lies parallel to the mounting rods 11 and 12. This feed screw is engaged releasably by a feed nut 16 carried by a rock lever 17 that is pivoted to a shaft 18 that is mounted on the carriage. The lever 17 is biased clockwise by a spring 19 so as normally to hold the feed nut 16 in engagement with the feed screw. It will be understood that the feed screw is coupled suitably to the mandrel 13 so that it is turned concurrently as the record is rotated to drive the carriage progressively across the record, but this coupling mechanism is well known and need not be described.

Secured to the carriage and interposed between it and the rod 12 is a long sleeve 20 which serves to provide a long bearing surface for the carriage on the rod. Mounted rotatably on this sleeve within the rearward hollow part of the carriage is a cam device 21 which comprises three collars 22, 23 and 24 spaced along the sleeve by intervening bushings 25 and all integrally secured together in one unit by rivets 26. This cam device is turned on the sleeve by a hand lever 27 which is pivoted to the side of the carriage and coupled by a link 27a to a stud screw 24a on the collar 24 (Figure 2). On the collar 22 there is a cross pin 28 which coacts with an arm 17a of the lever 17 to control the engagement of the feed nut 16 with the feed screw 15. When the cam device is in the position it occupies in Figure 1 this pin is free from the arm 17a and the feed nut is held engaged with the feed screw by the spring 19 aforementioned. However, on turning the cam device clockwise the pin 28 is moved against the arm 17a to disengage the feed nut from the feed screw, the pin coming to rest in a notch 29 in the arm 17a so as to detent the cam device in its operated position. When the cam device is turned further clockwise the pin 28 is moved free from the arm 17a and then the feed nut 16 is reengaged with the feed screw by the spring 19. On returning the cam device the feed nut is disengaged and then engaged, the same as in the clockwise movement of the cam device.

As is hereinafter described, the cam device 21 also controls the translating device to place it in recording and reproducing conditions respectively when the cam device is in its most counterclockwise and clockwise positions and in a neutral condition when the cam device is in the intermediate position above described. Accordingly, the counterclockwise, intermediate and clockwise positions of the cam device are herein referred to as its "recording," "neutral" and "reproducing" positions.

The translating device of my invention comprises a housing 30 of an annular shape. This housing seats in the opening 14 of the carriage onto the shoulder 14a, and is retained in its mounting position by screws 31 which are threaded through the side walls of the arm 10b of the carriage into engagement with openings 32 in the housing. The housing has a head portion 30a provided with two parallel mounting holes 33 for a frame 34 of the translating unit 35. The frame 34, shown in detail in Figures 3 and 6, is an integral structure comprising two spaced plate members 34a between which the translating unit is held by screws 36, a bar-shaped upright member 34b which joins the plate members and extends upwardly thereabove, and two side wings 34c which are joined to the upper part of the bar member. Riveted to the wings 34c are two rods 37 which slidably engage the mounting holes 33 to support the translating unit for rectilinear movement in a direction oblique to the record and at right angles to the direction of travel of the carriage. The translating unit is held stationary in the housing 30 during recording and reproducing, but is shifted with respect to the housing to condition the device for recording and reproducing as is hereinafter explained.

Preferably, a translating unit of the magnetic type is employed. This unit may be one of a standard construction as shown. The illustrative form of this unit herein shown comprises a permanent magnet 38 of a block shape to the opposite magnetic pole faces of which are clamped by rivets 39 (Figure 5) two non-permanent pole shoes 40. These pole shoes extend beyond the magnet in parallel relation to one another and then terminate in inwardly-turned end portions to form a narrow air gap 41 therebetween. Secured to the inner sides of the pole shoes at positions adjacent the permanent magnet are two non-permanent magnetic blocks 42 which have confronting semicylindrical faces 42a forming a bearing for an armature 43. The armature has a shaft 43a the end portions of which are covered by rubber sleeves 43b which engage the bearing faces 42a to provide a pivotal mounting for the armature and a suitable effective air gap between the armature and the blocks 42. The outer end portion of the armature extends through the air gap 41 wherein it is centrally held by rubber pads 44 interposed between it and the ends of the pole shoes. Surrounding the armature is a coil spool 45 having a central clearance opening for the armature. Wound on this spool is a field coil 46.

The armature 43 constitutes the vibratile portion of the translating unit. When a fluctuating current is passed through the field coil the armature is vibrated in the bearings 42a in accordance with the variations in the energizing current. On the other hand if the armature is moved physically it will cause corresponding current variations to be generated in the field coil. Thus, the translating unit may serve as the motor unit for a recorder and as a generator unit for a reproducer.

While a magnetic type of translating unit is preferred, it will be understood that my invention is not necessarily limited thereto but may be carried out with translating units of other types. For example, the unit 35 might alternatively be of a crystal type and have the same general shape as the unit 35 without requiring any substantial variation in the general construction of the mechanism of the translating device.

In dictating machines of the character described, the records vary in height because after a record has been recorded on and the recordation is transcribed the outer surface layer of the record bearing the recordation is shaved off so that the record may be used again, this process being repeated until the thickness of the record is reduced to a prescribed minimum value. In order that the translating device may record on and reproduce from such records, it is provided with a floating stylus system. This system comprises a bifurcated support lever 47 for the stylus means, which has two side arms 47a which straddle the translating unit and which are universally pivoted to the frame 34. The universal pivotal mounting for the supporting lever comprises a rectangular gimbal frame 48 pivoted at 49 on an axis in a vertical plane to the upper and lower portions of the frame 34. This gimbal frame carries a laterally-extending rod 50, which passes through a clearance opening 51 in the part 34b of the frame and lies at right angles to the axis just mentioned above. This rod has conical bearings 52 at its end which pivotally engage respective openings 53 in the side arms 47a of the supporting lever. These side arms are sprung apart so that they tend normally to be disengaged from the pivot bearings but are held constrained by means of a bolt 54 so as to engage the pivot bearings with a light pressure. It will accordingly be observed that the supporting member 47 has a universal mounting and that it is free to pivot vertically about the bearings 52 and is free to pivot laterally about the pivots 49.

Mounted in the side arms of the lever 47 at the free ends thereof are two cone pivots 55 which engage the hub 56a of a stylus lever 56 to support the lever pivotally on a lateral axis. Mounted in one arm of this stylus lever are recording and reproducing styli 57 and 58 spaced from one another lengthwise of the lever. Secured to the other arm of the stylus lever is a leaf spring 60 an end portion of which cooperates with the end portion of this arm to form a fork at the end of the stylus lever. This fork engages as a clamp a transverse part—a part substantially parallel to the record—of a U-shaped member 59 that is secured to the end portion of the armature 43. By this engagement of the fork with the member 59 the stylus lever is directly connected slidably and pivotally to the armature 43. This connection provides the stylus lever and its supporting lever 47 with a lateral freedom of movement relative to the translating unit because the stylus lever is free to slide laterally along the member 59, and it provides these levers also with an up-and-down freedom of movement relative to the translating unit because the stylus lever is free also to slide lengthwise thereof relative to the member 59.

A selective engagement of the recording and reproducing styli 57 and 58 with the record is produced by shifting the frame 34 back and forth within the housing 30 as aforementioned. This shifting is accomplished as the hand lever 27 is turned by a rocker system controlled by the cam device 21. This rocker system comprises a rock lever 61 pivoted on a shaft 62 between two upright standards 63 on the head portion 30*a* of the housing 30. This rock lever has a depending arm 61*a* which pivotally engages a transverse slot 64 in the upper part of the frame 34, and has a rearwardly-extending arm 61*b* on which is mounted a roller 65. The roller 65 engages a slot 66 provided in the end portion of a lever 67 that is pivoted at the back of the rod 12 on the shaft 18 aforementioned. The lever 67 carries a roller 68 which overlies the cam 23, and it has a depending arm which carries a second roller 69 that underlies this same cam. The cam 23 has a central dwell 23*a* receding by steps 23*b* and 23*c* at each end. When the cam device 21 is in its "record" position shown in Figure 1, the upper roller 68 contacts the dwell 23*a* and the lower roller 69 contacts the respective innermost step 23*c* to hold the lever 67 in its uppermost position. The rock lever 61 is therefore held in its most counterclockwise position, as viewed in Figure 1, to place the translating unit in its most rearward position relative to the record. In this position of the translating unit the recording stylus 57 engages the record as shown in Figure 1. As the cam device 21 is turned clockwise to its neutral position, the cam 23 contacts the roller 69 to swing the lever 67 downwardly to its intermediate position wherein both rollers 68 and 69 register with the intermediate steps 23*b* at the respective ends of the dwell 23*a*. As the lever 67 is swung to its intermediate position the translating unit is moved forwardly through about half the distance of the space between the recording and reproducing styli. As the translating unit is moved to this intermediate position, two stationary pins 70, carried by the housing 30, slidingly engage respective identical cams 71 provided on the side arms 47*a* of the supporting lever and cam this lever upwardly so as to hold the styli disengaged from the record as the translating device is shifted between recording and reproducing conditions. Upon further turning the cam device 21 clockwise to its reproducing position the cam 23 contacts the lower roller 69 and rocks the lever 67 into its downmost position, the lower roller 69 being now in contact with the dwell 23*a* and the upper roller 68 in registration with the innermost step 23*c*. This further downward movement of the lever 67 causes the translating unit to be shifted further forwardly so as to place the reproducing stylus 58 substantially in the position formerly occupied by the recording stylus 57. As the translating unit is so shifted into its reproducing position, the pins 70 are disengaged from the cams 71 and the support lever 47 is free to place the reproducing stylus in contact with the record.

When the device is conditioned for recording the recording stylus is held in contact with the record with the desired amount of pressure by the weight of the supporting lever 47 and of the stylus lever 56. Also, in the recording condition of the translating device the supporting lever is held in a centralized position against lateral movement. The means by which this is accomplished comprises a compound lever 72 pivoted near its base at opposite sides of the frame onto the rod 50. This lever has two upstanding arms 72*a* and is urged in a clockwise direction, as it is viewed in Figure 1, by a tension spring 73 connected between a lower part thereof which bridges the arms 72*a* and the top part of the gimbal frame 48. When the translating device is conditioned for recording the two arms 72*a* are pressed by the spring 73 against an abutment face 74 on the head 30*a* to hold the supporting lever stationary relative to the housing 30 in respect of its lateral freedom of movement. When the device is shifted into reproducing condition, however, the lever 72 is moved out of contact with the abutment face 74 and the tension of the spring 73 is taken up by the abutment of the aforementioned lower part of lever 72 against the under side of the bolt 54 carried by the supporting lever 47. As a result, the tension force of the spring 73 is now transmitted to the supporting lever to urge the lever clockwise and increase the pressure of the reproducing stylus against the record. Because the lever 72 is now out of contact with the abutment face 74 the supporting lever has a lateral freedom of movement so that the reproducing stylus may track the record.

I have herein particularly shown and described a preferred embodiment of my invention but it will be understood that this embodiment is subject to changes and modifications without departure from the scope of my invention, which I endeavor to express according to the following claims.

I claim:

1. In a phonographic translating device adapted for coaction with a moving record: the combination of a translating unit having a vibratile portion moved in a plane at right angles to the surface of the record, a member rigidly secured to said vibratile portion and having a part lying transverse to said plane, a supporting lever universally pivoted with respect to a fixed part of said unit, a stylus lever pivoted to said supporting lever on an axis transverse to said plane, said stylus lever including a part which pivotally and slidably contacts said transverse part of said member, and a spring mounted on one of said parts and bearing against the other of said parts for retaining said stylus lever in pivotal slidable contact with said member.

2. In a unitary device for recording on and reproducing from a moving record including a carriage mounted for traveling movement along the record: the combination of a motor-generator translating unit including a vibratile element mounted on said carriage for movement at right angles to that of said carriage and in directions oblique to the record, a supporting lever carried with said unit and mounted for universal movement with respect thereto, a stylus lever pivoted to said supporting lever and slidably pivotally and interlockingly connected to said vibratile element, recording and reproducing styli mounted on said stylus lever and spaced from each other in the direction of movement of said unit relative to said carriage, and means for shifting said unit relative to said carriage to move said styli selectively into contact with the record.

3. In a unitary device for recording on and reproducing from a moving record including a carriage mounted for traveling movement along the record: the combination of a motor-generator translating unit, a housing member for said unit provided with an abutment face substantially parallel to the direction of movement of the carriage along the record, means mounting said unit in said housing for movement transverse to said abutment face, a gimbal frame pivoted to said unit on an axis substantially in a plane at right angles to the record surface, a supporting lever pivoted to said gimbal frame on an axis in a transverse plane substantially parallel to the record surface, a stylus lever pivoted to said supporting lever and slidably pivotally connected to said unit, recording and reproducing styli mounted on said stylus, means for shifting said unit relative to said housing to move said styli selectively into contact with the record, a bifurcated lever pivoted to said supporting lever on an axis in said transverse plane, and spring means connected between said bifurcated lever and said gimbal frame for pressing the former against said abutment face when said recording stylus is in contact with the record for holding said supporting lever from transverse movement relative to said unit.

4. The combination set forth in claim 3 including means interposed between said bifurcated and supporting levers for causing said spring means to be coupled to said supporting lever to urge it towards the record when said unit is shifted to place said reproducing stylus in contact with the record.

5. In a phonographic translating apparatus adapted for coaction with a moving record and including a carriage mounted for movement along the record: the combination of a translating unit including a vibratile portion, a housing member for said unit mounted on said carriage, means mounting said translating unit on said housing member for rectilinear movement in directions oblique to the record, a supporting lever pivoted to said unit for universal movement and straddling said unit, a stylus lever pivoted to a free end portion of said supporting lever and having a slidable pivotal connection to said vibratile portion, recording and reproducing styli mounted on said stylus lever, means for shifting said unit to place said styli selectively into contact with the record, and means carried by said housing member for camming said supporting lever to withhold said styli from contact with the record during the shifting of said unit.

LOUIS Z. LA FOREST.

REFERENCES CITED

The following references are of record in the file of this patent:

UNITED STATES PATENTS

| Number | Name | Date |
|---|---|---|
| 454,942 | Edison | June 30, 1891 |
| 1,067,530 | Lindstrom | July 15, 1913 |
| 1,744,047 | Keller | Jan. 21, 1930 |
| 1,870,447 | Foley | Aug. 9, 1932 |
| 2,318,308 | Harris | May 4, 1943 |
| 2,326,625 | Di Toro | Aug. 10, 1943 |
| 2,359,370 | La Forest | Oct. 3, 1944 |

FOREIGN PATENTS

| Number | Country | Date |
|---|---|---|
| 270,086 | Germany | Feb. 10, 1914 |